United States Patent
Seshadri et al.

(10) Patent No.: US 12,423,166 B2
(45) Date of Patent: Sep. 23, 2025

(54) ADAPTIVE OBSERVABILITY MODULE RECONFIGURATION

(71) Applicant: International Business Machines Corporation, Armonk, NY (US)

(72) Inventors: Padmanabha Venkatagiri Seshadri, Mysore (IN); Pravein Govindan Kannan, Bangalore (IN); Praveen Jayachandran, Bangalore (IN); Ashok Pon Kumar Sree Prakash, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 471 days.

(21) Appl. No.: 17/987,329

(22) Filed: Nov. 15, 2022

(65) Prior Publication Data
US 2024/0160504 A1 May 16, 2024

(51) Int. Cl.
*G06F 9/54* (2006.01)
*G06F 11/34* (2006.01)

(52) U.S. Cl.
CPC .......... *G06F 9/542* (2013.01); *G06F 11/3495* (2013.01)

(58) Field of Classification Search
None
See application file for complete search history.

(56) References Cited

U.S. PATENT DOCUMENTS

| 10,623,372 | B2 | 4/2020 | Wang et al. |
| 11,599,343 | B2 * | 3/2023 | Dominick ............. G06F 11/302 |
| 2020/0193017 | A1 | 6/2020 | Bannister et al. |
| 2022/0200869 | A1 | 6/2022 | Erlingsson et al. |

(Continued)

FOREIGN PATENT DOCUMENTS

| CN | 112395051 A | 2/2021 |
| CN | 114691391 A | 7/2022 |

(Continued)

OTHER PUBLICATIONS

Scholz et al., Performance Implications of Packet Filtering with Linux eBPF, 2018 30th International Teletraffic Congress (ITC 30), Sep. 3-7, 2018.

(Continued)

*Primary Examiner* — Craig C Dorais
(74) *Attorney, Agent, or Firm* — Garg Law Firm, PLLC; Rakesh Garg; Caleb Wilkes (57) ABSTRACT

Using interaction profiling data and deployment state data of a software application, an observability module configuration plan is generated, the configuration plan comprising an event to be observed and an observability parameter. Using infrastructure state estimation data of the infrastructure on which the software application is executing, the observability module configuration plan is adjusted, the adjusting resulting in an adjusted reconfiguration plan, the adjusted reconfiguration plan comprising a second event to be observed, the second event associated with a node failure within the infrastructure. A set of observability modules is reconfigured according to the adjusted reconfiguration plan, (Continued)

the reconfiguring comprising causing an observability module in the set of observability modules to be activated to monitor the event.

20 Claims, 6 Drawing Sheets

(56) References Cited

U.S. PATENT DOCUMENTS

| | | | |
|---|---|---|---|
| 2022/0215101 A1 | 7/2022 | Rioux et al. | |
| 2023/0315397 A1* | 10/2023 | Prasad Tanniru | G06F 8/33 |
| 2023/0368873 A1* | 11/2023 | Jimenez Roda | G06F 9/542 |

FOREIGN PATENT DOCUMENTS

| | | |
|---|---|---|
| DE | 112018004464 T5 | 5/2020 |
| IL | 278157 B | 4/2021 |

OTHER PUBLICATIONS

Miano et al., A Framework for eBPF-Based Network Functions in an Era of Microservices, IEEE Transactions on Network and Service Management, vol. 18, No. 1, Mar. 2021.

Abranches et al., Efficient Network Monitoring Applications in the Kernel with eBPF and XDP, 2021 IEEE Conference on Network Function Virtualization and Software Defined Networks (NFV-SDN), Nov. 9-11, 2021.

Deri et al., Combining System Visibility and Security Using eBPF, ITASEC 2019.

Levin et al., ViperProbe: Rethinking Microservice Observability with eBPF, 2020 IEEE 9th International Conference on Cloud Networking (CloudNet), Nov. 9-11, 2020.

Nakryiko, BCC to libbpf conversion guide, Feb. 20, 2020, https://nakryiko.com/posts/bcc-to-libbpf-howto-guide/#why-libbpf-and-bpf-co-re.

Telea et al., Extraction and visualization of call dependencies for large C/C++ code bases: A comparative study, 2009 5th IEEE International workshop on visualizing software for understanding and analysis, pp. 81-88, IEEE, Sep. 25-26, 2009.

Sipio et al., A multinomial naïve bayesian (mnb) network to automatically recommend topics for github repositories, Evaluation and Assessment in Software Engineering, pp. 71-80, Apr. 17, 2020.

Miano et al., Creating complex network services with ebpf: Experience and lessons learned, 2018 IEEE 19th International Conference on High Performance Switching and Routing (HPSR), pp. 1-8, IEEE, Jun. 18-20, 2018.

Bachl et al., A flow-based IDS using Machine Learning in eBPF, Mar. 4, 2022.

Gregg Brenden. "BPF Performance Tools (book)", retrieved from web https://www.brendangregg.com/bpf-performance-tools-book.html, dated May 13, 2025, Publication date—Dec. 2019, 7 pages.

No Author. "Monitor file access by Linux processes", retrieved from web https://linux-audit.com/monitor-file-access-by-linux-processes/, dated May 13, 2025, 13 pages.

Kahle Bryce. "How and When You Should Measure CPU Overhead of eBPF Programs", retrieved from web https://ebpf.io/summit-2020-slides/eBPF_Summit_2020-Lightning-Bryce_Kahle-How_and_When_You_Should_Measure_CPU_Overhead_of_eBPF_Programs.pdf, Oct. 28, 2020, 20 pages.

* cited by examiner

ADAPTIVE OBSERVABILITY MODULE RECONFIGURATION

BACKGROUND

The present invention relates generally to a method, system, and computer program product for observability module management. More particularly, the present invention relates to a method, system, and computer program product for adaptive observability module configuration.

Observability refers to software used to monitor computer systems and the applications running on the systems, provide alerts upon an anomaly, and to provide data with which to debug errors, anomalies, and performance problems. Observability focuses on four main types of data. Logs are granular, timestamped, and immutable records of application events that can be used to create a record of every event, complete with surrounding context, that a developer can use for troubleshooting and debugging. Metrics are measures of application and system health over a given period of time, such as how much memory or processor capacity an application uses over a five-minute span, or how much latency an application experiences during a spike in usage. Traces record the end-to-end journey of a user request and application response, from the source (e.g., a user interface) through the modules of an application and back to the user. Dependencies reveal how each application component depends on other components, applications, and computing resources.

In a typical operating system, memory is separated into user space and kernel space. Kernel space is reserved for running the operating system kernel, kernel extensions, and most device drivers, while application software and some drivers execute in user space and interact with the kernel through specified function calls. Software modules are referred to as either in-kernel modules, executing in kernel space, or user modules, executing in user space.

An observability module is software that implements one or more observability support functions. In a typical architecture, a user-level observability module provides an interface between an application or an application component (also referred to as a service) and one or more in-kernel (or kernel) observability modules. In-kernel observability modules execute in kernel space in order to have access to both kernel and user-space data. One example of a kernel and user-space observability scheme is eBPF (Extended Berkeley Packet Filter), in the Linux operating system, which provides observability in a network, processors and input/output (I/O). (Linux is a registered trademark of Linus Torvalds in the United States and other countries.) In-kernel BPF code can perform actions for events, such as counting the number of a particular kind of event or creating a stack trace at the time of an event. One example of an observability support function is code that triggered when a call to a kernel function (also called a system call) is executed. Another example framework, Cilium, is software for providing, securing and observing network connectivity between container workloads using eBPF. Another example framework, Tracee, is a runtime security and forensics tool for Linux, using eBPF technology to trace a system and applications at runtime and analyze collected events in order to detect suspicious behavioral patterns. (Tracee is a registered trademark of Aqua Security Software Ltd. in the United States and other countries.)

SUMMARY

The illustrative embodiments provide a method, system, and computer program product. An embodiment includes a method that generates, using interaction profiling data and deployment state data of a software application, an observability module configuration plan, the configuration plan comprising an event to be observed and an observability parameter. An embodiment adjusts, using infrastructure state estimation data of the infrastructure on which the software application is executing, the observability module configuration plan, the adjusting resulting in an adjusted reconfiguration plan, the adjusted reconfiguration plan comprising a second event to be observed, the second event associated with a node failure within the infrastructure. An embodiment reconfigures, according to the adjusted reconfiguration plan, a set of observability modules, the reconfiguring comprising causing an observability module in the set of observability modules to be activated to monitor the event.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that observability frameworks usually monitor a super-set of metrics pertaining to various system calls and I/O regardless of the underlying application or the deployment setting. Observability modules consume memory and require processor time to execute. However, incurring this overhead does not always result an optimal amount and type of data. For example, application components do not necessarily use all of same system calls, and thus using one observability module to monitor all the system calls that could be made by any component could lead to unwanted work done by the module. For example, a network communications module of an application that does not perform storage activity does not require storage observability services. As well, another application not currently being observed might also use the system calls being monitored, incurring additional overhead to produce unwanted data. In addition, different system calls incur different amounts of observability overhead. The scope of what is to be observed (referred to as observability scope) often changes over time, for example as executing applications or the resources available for application use are added, removed, or changed. Observation granularity (how often an observation is produced) also results in wastage if the observation granularity does not match the application activity or infrastructure state. For example, having network monitoring always active for an application that sends out data only once per hour generates unwanted data from processes unrelated to the application being monitored, and might interfere with performance of those unrelated processes unnecessarily. Consequently, the illustrative embodiments recognize that there is a need to implement observability capabilities that are appropriate to a particular application and deployment context, to minimize observability overhead while capturing relevant information. In addition, because the application and deployment context can change, the illustrative embodiments recognize that there is a need to modify implemented observability capabilities to adapt to changes in what is being observed.

The illustrative embodiments recognize that the presently available tools or solutions do not address these needs or provide adequate solutions for these needs. The illustrative embodiments used to describe the invention generally address and solve the above-described problems and other problems related to adaptive observability module configuration.

An embodiment can be implemented as a software application. The application implementing an embodiment can be configured as a modification of an existing observability implementation, as a separate application that operates in conjunction with an existing observability implementation, a standalone application, or some combination thereof.

Particularly, some illustrative embodiments provide a method that generates an observability module configuration plan comprising an event to be observed and an observability parameter, adjusts the observability module configuration plan to include a second event to be observed, and reconfigures, according to the adjusted reconfiguration plan, a set of observability modules, the reconfiguring comprising causing an observability module in the set of observability modules to be activated to monitor the event.

An embodiment adjusts the source code of one or more observability modules so as to improve an ability to perform selective compilation of portions of a kernel observability module. Selective compilation helps reduce the size of kernel observability module executables, reducing both their load time and computational load on the system in which they execute, by avoiding compilation of a portion of a module that is not needed in a particular observability configuration.

Some kernel observability modules are just-in-time compiled, i.e., they are compiled when invoked. To invoke these modules, a user observability module loads kernel observability module source to the kernel, causing a module loading toolchain (e.g., the BCC compiler for eBPF) to compile, verify, and load the executable module into the kernel. Following this, the loaded executable kernel module can be activated at a hook point (a predefined point at which to attach an eBPF program) or for a desired kernel event (such as system call invocation or return). Thus, to implement selected compilation for a just-in-time compiled kernel module, an embodiment inserts, into the module's source code, a set of preprocessing directives around per-service-component specific code associated with each type of event to be observed, so that code within a set of preprocessing directives is compiled only if a particular variable is defined. Then, when an embodiment implements an observability module configuration, the embodiment invokes a user module with only variables corresponding to specific events defined, and the user module invokes a kernel module with only those same variables defined, causing only the corresponding specific code to be compiled. For example, the pseudocode:

```
int kModFunc(void* ctx) {
#ifdef __SERVICE_1__
    // Service 1 related code goes here
#endif
#ifdef __SERVICE_2__
    // Service 2 related code goes here
#endif
#ifdef __SERVICE_3__
    // Service 3 related code goes here
#endif
    return 0;
}
``` might be used to compile code related to observability services 1, 2, and 3 only if the corresponding variables __SERVICE_1__, __SERVICE_2__, and __SERVICE_3 are defined.

Some kernel observability modules are compiled once and distributed as binaries (i.e., executable code). To invoke these modules, a user observability module loads a compiled kernel observability module into the kernel and associates the kernel module with desired kernel events or hook points. Thus, to implement selected compilation for a compiled-once kernel module, an embodiment generates wrapper code that wraps a user observability module's invocation of individual kernel observability modules. Only this wrapper is compiled at the target machine to reduce compilation time of the user module. Then the user module loads and activates the compiled kernel module when needed. For example, if kModS1( ) and kModS2( ) are binaries implementing kernel observability modules 1 and 2 respectively, wrapper pseudocode:

```
int kModFunc(void* ctx) {
    kModS1( );
    kModS2( );
    return 0;
}
``` might be used to load and activate compiled kernel modules 1 and 2. In one embodiment, the generated wrapper code is generated using a naming convention that incorporates the name of a system call (i.e., an operating system function or method) being observed, the resource type being observed, and functionality that the system call is performing with respect to the resource type. System calls are capable of performing difference functionality using the same call. For example, a read( ) system call reads data from a disk (when performed with respect to a storage resource), and reads a socket stream (when performed with respect to a network resource). Techniques are presently available to infer, from source code or executable code, the name of a system call being observed, the resource type being observed, and functionality that the system call is performing with respect to the resource type.

An embodiment maintains one or more adjusted observability modules in a library of observability modules, for use in implementing observability for an application or system. An embodiment also includes, in the library, one or more unadjusted observability modules.

An embodiment receives application execution data, infrastructure state data, and application source code, if source code is available, for an application to be observed while executing on an infrastructure. An infrastructure includes one or more computer systems, communicating via a network. The computer systems are also referred to as nodes.

An embodiment extracts interaction profiling data from the application execution data. Interaction profiling data is data of how an application interacts with an operating system, including data of operating system calls made by an application. One embodiment uses a presently available call-graph extraction technique to analyze source code or an executable of an application component (e.g., an application module or service). The analysis produces a list of function calls made by the application component. An embodiment filters the list to exclude function calls that are not system calls. Another embodiment uses a presently available system call tracing technique (e.g., using strace, a utility used to trace system calls and libraries available in Linux and related operating systems) to generate a list of function calls made by an application component and their frequency, and filters the list to exclude function calls that are not system calls.

An embodiment extracts deployment state data from the application execution data and infrastructure state data. Deployment state data is data of executing instances of an application component (e.g., an application module or service), as well as the systems on which the instances are executing. One embodiment uses a presently available technique (e.g., using the Kubernetes kubectl command to obtain system information and application information known to a system manager, such as the compute resources used, network usage, and other statistics related to application deployment such as node information) to monitor the instances and their host systems, and assembles the data into a mapping that indicates which application components are executing on a particular host system. (Kubernetes is a registered trademark of the Linux Foundation in the United States and other countries.)

An embodiment also uses infrastructure state data to monitor the infrastructure on which one or more application instances are executing. One embodiment extracts infrastructure state estimation data, which is data on one or more of node failures, failures within node resources, application instances that are loaded, unloaded, or restarted within a specified time period, and other indications that a node might be experiencing a problem that warrants additional data collection (and hence, observability).

An embodiment uses the interaction profiling data and deployment state data to generate an observability module configuration plan. An observability module configuration plan specifies which system calls or other events, for which application component instances executing on which systems, are to have observability enabled, as well as one or more observability parameters. In one embodiment, the plan is a hierarchical list, organized by nodes, then one level lower system calls and event to be observed on a node, then one level lower application components associated with a particular system call or event, along with one or more observability parameters. One observability parameter specifies the frequency with which the system call or event is expected to occur. An embodiment sets the frequency parameter based on the system call frequency data extracted from the interaction profiling data. Another observability parameter specifies an analysis depth. A kernel observability module can be organized with selective compilation levels such that increasing the selective compilation level increases the depth of analysis performed for a monitored event or system call. Thus, specifying the analysis depth as an observability parameter enables an embodiment to configure an observability module accordingly when the plan is implanted. One embodiment sets the depth parameter to a default value. Another embodiment sets the depth parameter to a value specified by a user. Another embodiment sets the depth parameter based on one or more node characteristics extracted from the deployment state data. For example, a node with a population of service instances above a threshold amount, or a node processing above a threshold amount of network traffic from above a threshold number of other nodes might merit additional observability coverage because of their higher workload.

As a non-limiting example, the plan might include, at the top level of a hierarchy, nodes 1 and 2. Underneath node 1 are two system calls, sys1 and sys2. Underneath sys1 are three application components or services, svc1, svc2, and svc3. For svc1, the plan specifies two parameters: a frequency of 10 and a kernel analysis depth of 0. For svc2, the plan specifies two parameters: a frequency of 1 and a kernel analysis depth of 1. For svc3, the plan specifies two parameters: a frequency of 11 and a kernel analysis depth of 1. Svc1, svc2, and svc3 are also underneath sys2. For svc1, the plan specifies two parameters: a frequency of 10 and a kernel analysis depth of 1. For svc2, the plan specifies two parameters: a frequency of 1 and a kernel analysis depth of 2. For svc3, the plan specifies two parameters: a frequency of 11 and a kernel analysis depth of 1. Note that because sys1 and sys2 are two different system calls, the services' observability parameters with respect to the different system calls can also differ. Underneath node 2 are two system calls, sys1 and sys3. Underneath sys1 is one application component, svc5, with two parameters: a frequency of 10 and a kernel analysis depth of 0. Underneath sys3 is one application component, svc5, with two parameters: a frequency of 10 and a kernel analysis depth of 1.

Because infrastructure state estimation data can indicate that a node might be experiencing a problem that warrants additional data collection, an embodiment uses the infrastructure state estimation data to adjust the observability module configuration plan to perform that additional data collection. In particular, for a node with a failure history or a failure frequency above a threshold rate, an embodiment adjusts the plan to include, increase the frequency of, or increase the analysis depth of, monitoring of one or more system calls and events that are part of the most likely failure causes.

An embodiment reconfigures a set of observability modules according to the adjusted observability module configuration plan. In particular, an embodiment manages kernel observability module loading, activation, and unloading such that a module is active during a time period when a system call or event of interest is more likely to occur and inactive during a time period when a system call or event of interest is less likely to occur. An embodiment loads and activates a kernel observability module, then deactivates the kernel observability module upon expiration of a module activation time period, then continues the loading/unloading cycle by reactivating the kernel observability module upon expiration of a second time period between activations if appropriate. To guide the loading/unloading cycle, an embodiment maintains two parameters for each kernel observability module being reconfigured: a time interval between module activations and an amount of time during which the module is activated. As an event to be monitored nears, an embodiment shortens the time interval between module activations and lengthens the amount of time during which the module is activated, to increase a probability that data surrounding the event will be captured. Conversely, once an event to be monitored has passed, an embodiment lengthens the time interval between module activations and shortens the amount of time during which the module is activated, to free up system resources during a time when observability is unlikely to be needed. Embodiments use linear or non-linear functions to model the desired behavior. One embodiment computes the time interval between module activations using the function $k*e^t$, in which k is a constant, e is Euler's number, and t is a time since the last event. Other embodiments model the desired behavior using presently available recurrent neural network, reinforcement learning, or Markov decision process based techniques to learn from historical data. An embodiment loads and activates a kernel observability module according to a time interval between module activations, and unloads the kernel observability module after amount of time during which the module is activated elapses. If a kernel observability module processes more than one application component, an embodiment uses the highest frequency parameter specified in the adjusted observability module configuration plan for the application components.

While an embodiment is implementing observability according to the adjusted observability module configuration plan, the embodiment receives additional application execution data and infrastructure state data, as well as data generated by the observability modules. Data generated by the observability modules is also referred to as observability data. Observability data includes granularity data, which is data of how detailed, or granular, the observability data is.

An embodiment analyzes the additional application execution data, infrastructure state data, and granularity data, further adjusts the adjusted observability module configuration plan according to the new data, and reconfigures a set of observability modules according to the further adjusted observability module configuration plan. If an embodiment determines that an event of interest was missed, or contains insufficient data, the embodiment alters control of a time interval between module activations and an amount of time during which the module is activated to increase a likelihood that an observability module will be activated the next time the event occurs. Another embodiment ages events being monitored, and resets the age to zero when a monitored event occurs. If a monitored event's age increases above a threshold age (e.g., an event is expected to occur once per hour and the event has not occurred in the past 24 hours), the embodiment assumes the event is no longer expected and ceases managing observability to monitor that event. If a node with a failure history or a failure frequency above a threshold rate fails again, an embodiment readjusts the plan to include, increase the frequency of, or increase the analysis depth of, monitoring of one or more system calls and events that are part of the most likely failure causes. If a node with a failure history or a failure frequency above a threshold rate exhibits a pattern indicating that it has above a threshold probability of failing again, an embodiment also readjusts the plan to include, increase the frequency of, or increase the analysis depth of, monitoring of one or more system calls and events that are part of the most likely failure causes.

The manner of adaptive observability module configuration described herein is unavailable in the presently available methods in the technological field of endeavor pertaining to software observability. A method of an embodiment described herein, when implemented to execute on a device or data processing system, comprises substantial advancement of the functionality of that device or data processing system in generating an observability module configuration plan comprising an event to be observed and an observability parameter, adjusting the observability module configuration plan to include a second event to be observed, and reconfiguring, according to the adjusted reconfiguration plan, a set of observability modules, the reconfiguring comprising causing an observability module in the set of observability modules to be activated to monitor the event.

The illustrative embodiments are described with respect to certain types of services, observability modules, infrastructures, nodes, parameters, time intervals, forecasts, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
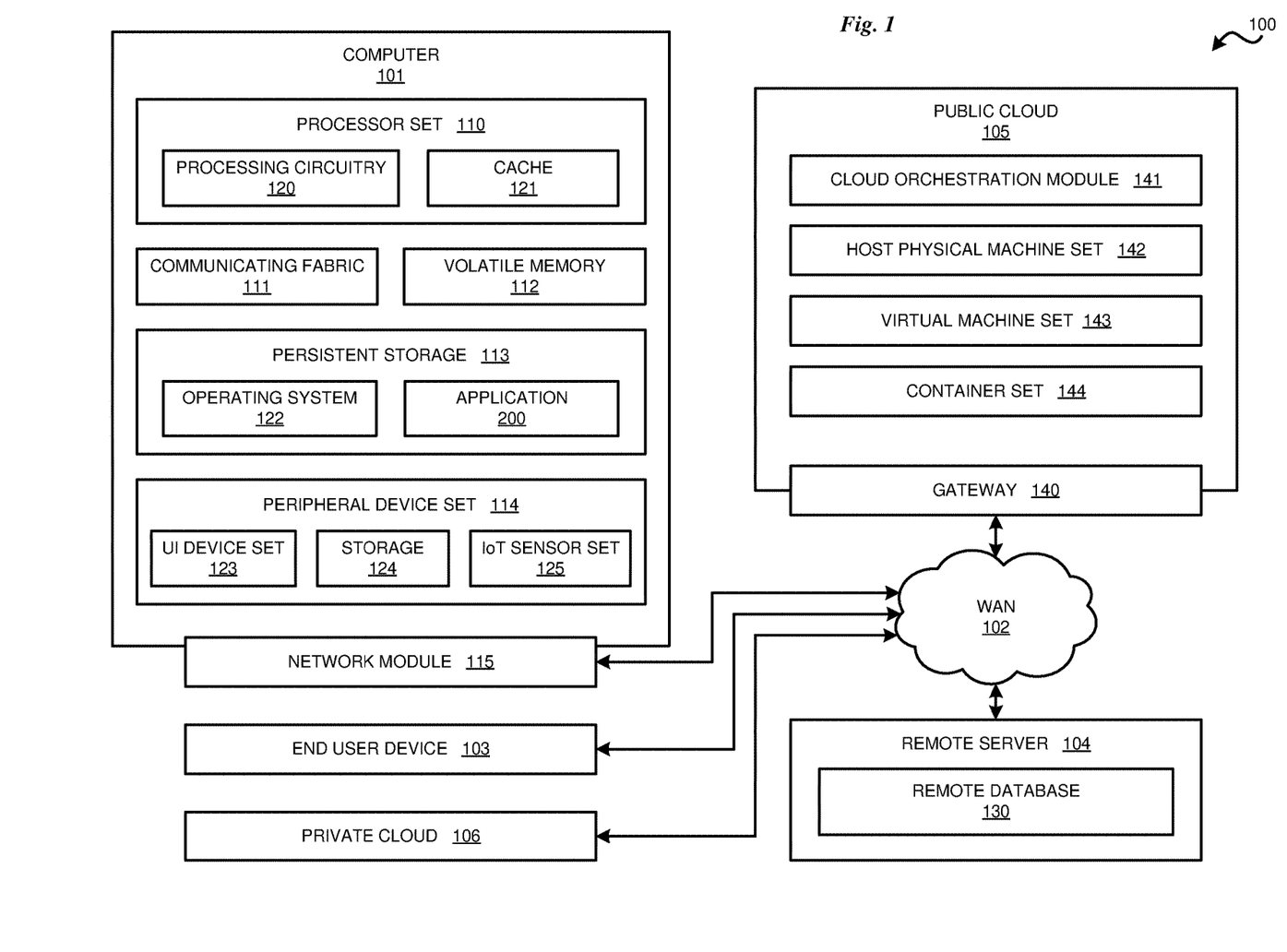
FIG. 1 depicts an example diagram of a data processing environments in which illustrative embodiments may be implemented.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements an adaptive observability module configuration embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. In addition, application 200 implements observability in any of computer 101, end user device 103, remote server 104, or a computer in public cloud 105 or private cloud 106, or in another system, and need not be executing in the same system as a system in which observability is being implemented.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
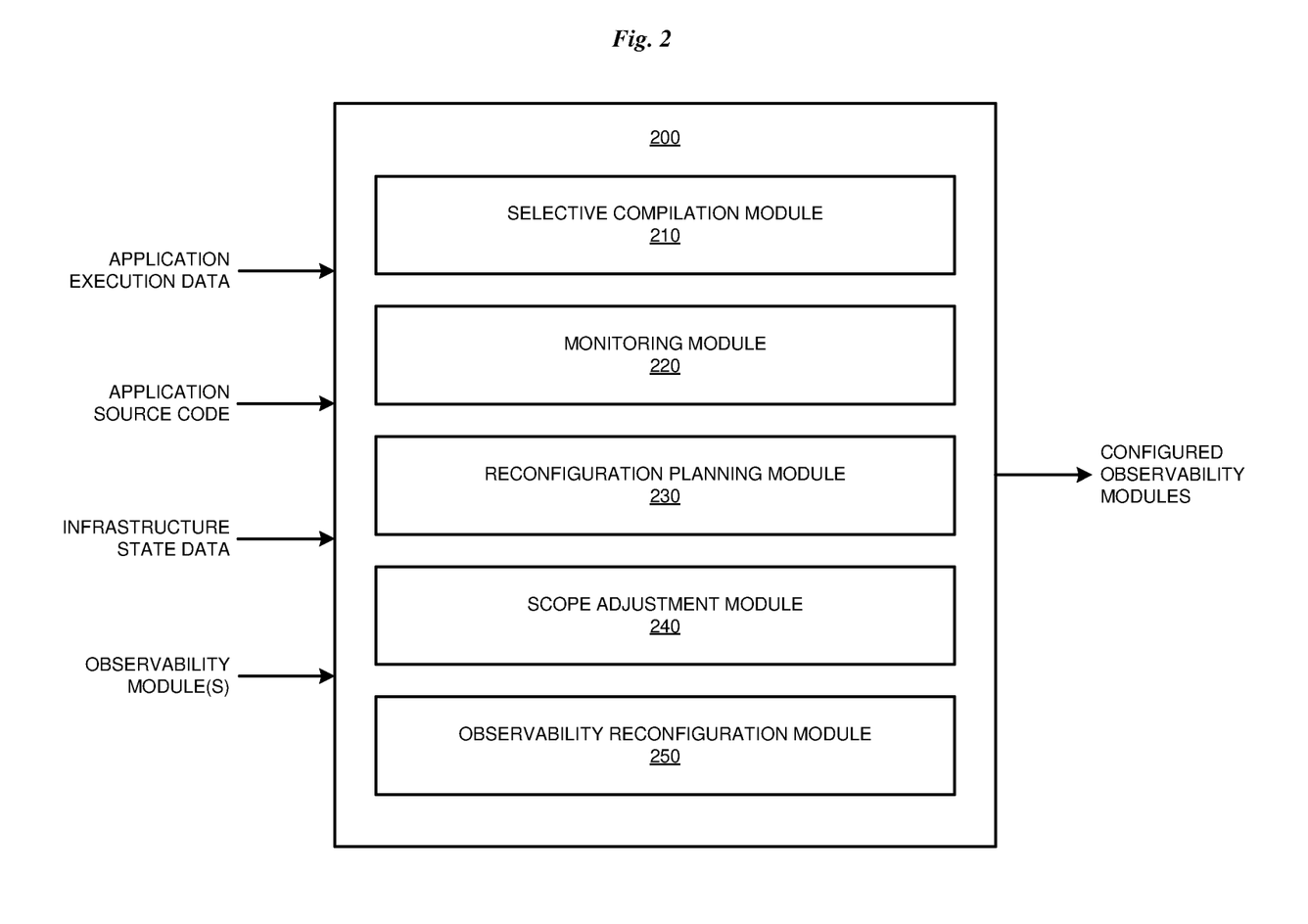
FIG. 2 depicts a block diagram of an example configuration for adaptive observability module configuration in accordance with an illustrative embodiment.

With reference to FIG. 2, this figure depicts a block diagram of an example configuration for adaptive observability module configuration in accordance with an illustrative embodiment. Application 200 is the same as application 200 in FIG. 1.

Selective compilation module 210 adjusts the source code of one or more observability modules so as to improve an ability to perform selective compilation of portions of a kernel observability module. To implement selected compilation for a just-in-time compiled kernel module, module 210 inserts, into the module's source code, a set of preprocessing directives around per-service-component specific code associated with each type of event to be observed, so that code within a set of preprocessing directives is compiled only if a particular variable is defined. Then, when application 200 implements an observability module configuration, application 200 invokes a user module with only variables corresponding to specific events defined, and the user module invokes a kernel module with only those same variables defined, causing only the corresponding specific code to be compiled. To implement selected compilation for a compiled-once kernel module, module 210 generates wrapper code that wraps a user observability module's invocation of individual kernel observability modules. Only this wrapper is compiled at the target machine to reduce compilation time of the user module. Then the user module loads and activates the compiled kernel module when needed. In one implementation of module 210, the generated wrapper code is generated using a naming convention that incorporates the name of a system call being observed, the resource type being observed, and functionality that the system call is performing with respect to the resource type. Module 210 maintains one or more adjusted observability modules in a library of observability modules, for use in implementing observability for an application or system. Module 210 also includes, in the library, one or more unadjusted observability modules.

Application 200 receives application execution data, infrastructure state data, and application source code, if source code is available, for an application to be observed while executing on an infrastructure.

Monitoring module 220 extracts interaction profiling data from the application execution data. Monitoring module 220 also extracts deployment state data from the application execution data and infrastructure state data. Monitoring module 220 also uses infrastructure state data to monitor the infrastructure on which one or more application instances are executing.

Reconfiguration planning module 230 uses the interaction profiling data and deployment state data to generate an observability module configuration plan. An observability module configuration plan specifies which system calls or other events, for which application component instances executing on which systems, are to have observability enabled, as well as one or more observability parameters. In one implementation of module 230, the plan is a hierarchical list, organized by nodes, then one level lower system calls and event to be observed on a node, then one level lower application components associated with a particular system call or event, along with one or more observability parameters. One observability parameter specifies the frequency with which the system call or event is expected to occur. Module 230 sets the frequency parameter based on the system call frequency data extracted from the interaction profiling data. Another observability parameter specifies an analysis depth. A kernel observability module can be organized with selective compilation levels such that increasing the selective compilation level increases the depth of analysis performed for a monitored event or system call. Thus, specifying the analysis depth as an observability parameter enables module 230 to configure an observability module accordingly when the plan is implanted. One implementation of module 230 sets the depth parameter to a default value. Another implementation of module 230 sets the depth parameter to a value specified by a user. Another implementation of module 230 sets the depth parameter based on one or more node characteristics extracted from the deployment state data. For example, a node with a population of service instances above a threshold amount, or a node processing above a threshold amount of network traffic from above a threshold number of other nodes might merit additional observability coverage because of their higher workload.

Scope adjustment module 240 uses the infrastructure state estimation data to adjust the observability module configuration plan to perform that additional data collection. In particular, for a node with a failure history or a failure frequency above a threshold rate, module 240 adjusts the plan to include, increase the frequency of, or increase the analysis depth of, monitoring of one or more system calls and events that are part of the most likely failure causes.

Observability reconfiguration module 250 reconfigures a set of observability modules according to the adjusted observability module configuration plan. In particular, module 250 manages kernel observability module loading, activation, and unloading such that a module is active during a time period when a system call or event of interest is more likely to occur and inactive during a time period when a system call or event of interest is less likely to occur. Module 250 loads and activates a kernel observability module, then deactivates the kernel observability module upon expiration of a module activation time period, then continues the loading/unloading cycle by reactivating the kernel observability module upon expiration of a second time period between activations if appropriate. To guide the loading/unloading cycle, module 250 maintains two parameters for each kernel observability module being reconfigured: a time interval between module activations and an amount of time during which the module is activated. As an event to be monitored nears, module 250 shortens the time interval between module activations and lengthens the amount of time during which the module is activated, to increase a probability that data surrounding the event will be captured. Conversely, once an event to be monitored has passed, module 250 lengthens the time interval between module activations and shortens the amount of time during which the module is activated, to free up system resources during a time when observability is unlikely to be needed. Implementations of module 250 use linear or non-linear functions to model the desired behavior. One implementation of module 250 computes the time interval between module activations using the function $k*e^t$, in which k is a constant, e is Euler's number, and t is a time since the last event. Other implementation of module 250 model the desired behavior using presently available recurrent neural network, reinforcement learning, or Markov decision process based techniques to learn from historical data. Module 250 loads and activates a kernel observability module according to a time interval between module activations, and unloads the kernel observability module after amount of time during which the module is activated elapses. If a kernel observability module processes more than one application component, module 250 uses the highest frequency parameter specified in the adjusted observability module configuration plan for the application components.

While module 250 is implementing observability according to the adjusted observability module configuration plan, application 200 receives additional application execution data and infrastructure state data, as well as data generated by the observability modules. Data generated by the observability modules is also referred to as observability data. Observability data includes granularity data, which is data of how detailed, or granular, the observability data is.

Application 200 analyzes the additional application execution data, infrastructure state data, and granularity data, further adjusts the adjusted observability module configuration plan according to the new data, and reconfigures a set of observability modules according to the further adjusted observability module configuration plan. If module 250 determines that an event of interest was missed, or contains insufficient data, module 250 alters control of a time interval between module activations and an amount of time during which the module is activated to increase a likelihood that an observability module will be activated the next time the event occurs. Another implementation of module 250 ages events being monitored, and resets the age to zero when a monitored event occurs. If a monitored event's age increases above a threshold age (e.g., an event is expected to occur once per hour and the event has not occurred in the past 24 hours), module 250 assumes the event is no longer expected and ceases managing observability to monitor that event. If a node with a failure history or a failure frequency above a threshold rate fails again, module 250 readjusts the plan to include, increase the frequency of, or increase the analysis depth of, monitoring of one or more system calls and events that are part of the most likely failure causes. If a node with a failure history or a failure frequency above a threshold rate exhibits a pattern indicating that it has above a threshold probability of failing again, module 250 also readjusts the plan to include, increase the frequency of, or increase the analysis depth of, monitoring of one or more system calls and events that are part of the most likely failure causes.

Figure 3:
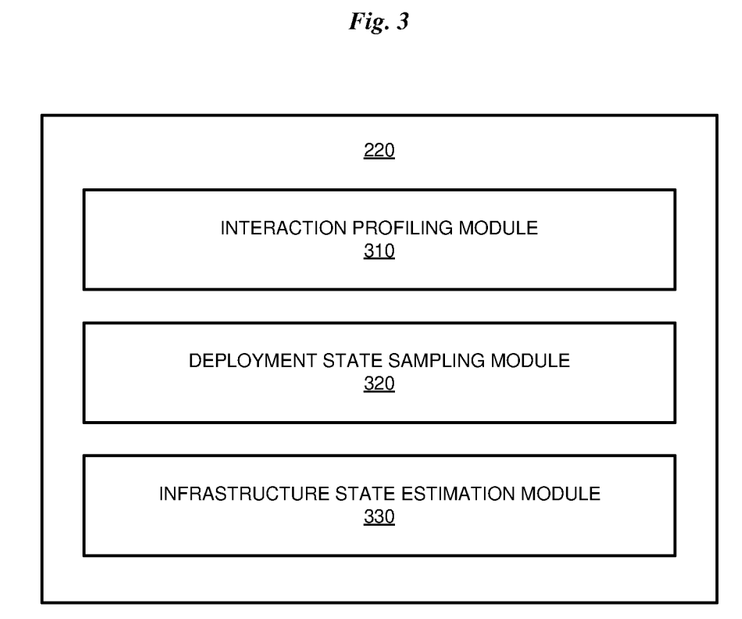
FIG. 3 depicts a block diagram of an example configuration for adaptive observability module configuration in accordance with an illustrative embodiment.

With reference to FIG. 3, this figure depicts a block diagram of an example configuration for adaptive observability module configuration in accordance with an illustrative embodiment. In particular, FIG. 3 depicts more detail of monitoring module 220 in FIG. 2.

Interaction profiling module 310 extracts interaction profiling data from the application execution data. Interaction profiling data is data of how an application interacts with an operating system, including data of operating system calls made by an application. One implementation of module 310 uses a presently available call-graph extraction technique to analyze source code or an executable of an application component (e.g., an application module or service). The analysis produces a list of function calls made by the application component. Module 310 filters the list to exclude function calls that are not system calls. Another implementation of module 310 uses a presently available system call tracing technique (e.g., using strace) to generate a list of function calls made by an application component and their frequency, and filters the list to exclude function calls that are not system calls.

Deployment state sampling module 320 extracts deployment state data from the application execution data and infrastructure state data. Deployment state data is data of executing instances of an application component (e.g., an application module or service), as well as the systems on which the instances are executing. One implementation of module 320 uses a presently available technique (e.g., using the Kubernetes kubectl command to obtain system and application information) to monitor the instances and their host systems, and assembles the data into a mapping that indicates which application components are executing on a particular host system.

Infrastructure state estimation module 330 also uses infrastructure state data to monitor the infrastructure on which one or more application instances are executing. One implementation of module 330 extracts infrastructure state estimation data, which is data on one or more of node failures, failures within node resources, application instances that are loaded, unloaded, or restarted within a specified time period, and other indications that a node might be experiencing a problem that warrants additional data collection (and hence, observability).

Figure 4:
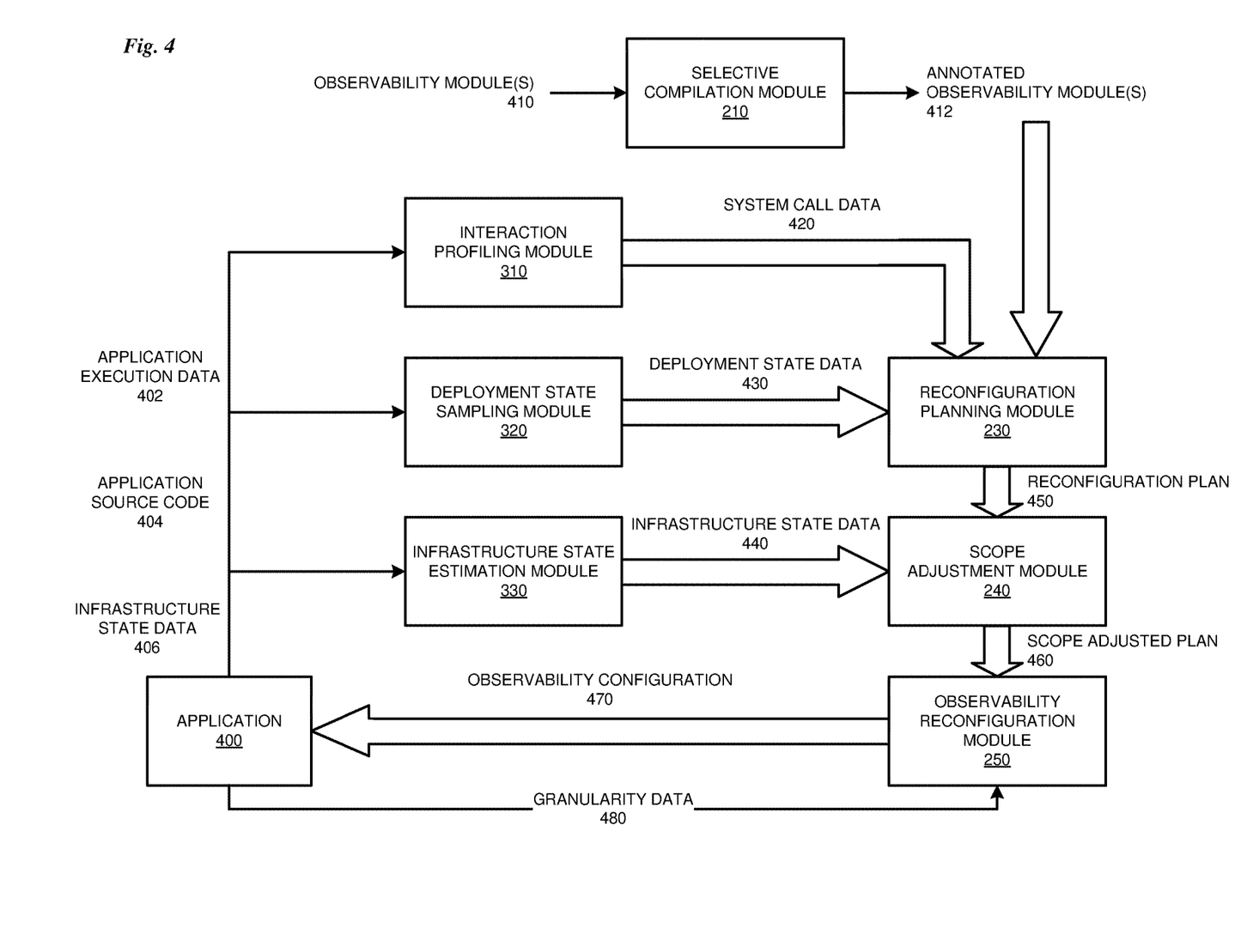
FIG. 4 depicts a flow diagram of an example configuration for adaptive observability module configuration in accordance with an illustrative embodiment.

With reference to FIG. 4, this figure depicts a flow diagram of an example configuration for adaptive observability module configuration in accordance with an illustrative embodiment. Selective compilation module 210, reconfiguration planning module 230, scope adjustment module 240, and observability reconfiguration module 250 are the same as selective compilation module 210, reconfiguration planning module 230, scope adjustment module 240, and observability reconfiguration module 250 in FIG. 2. Interaction profiling module 310, deployment state sampling module 320, and infrastructure state estimation module 330 are the same as interaction profiling module 310, deployment state sampling module 320, and infrastructure state estimation module 330 in FIG. 3.

Selective compilation module 210 adjusts the source code of observability module(s) 410 so as to improve an ability to perform selective compilation of portions of a kernel observability module, producing annotated observability module(s) 412.

Interaction profiling module 310 extracts interaction profiling data from application execution data 402 and application source code 404 of application 400, producing system call data 420. Deployment state sampling module 320 extracts deployment state data 430 from application execution data 402 and infrastructure state data 406. Infrastructure state estimation module 330 also uses infrastructure state data 406 to monitor the infrastructure on which one or more instances of application 400 are executing, extracting infrastructure state estimation data 440.

Reconfiguration planning module 230 uses system call data 420, deployment state data 430, and annotated observability module(s) 412 to generate reconfiguration plan 450. Scope adjustment module 240 uses infrastructure state estimation data 440 to adjust plan 450 to perform that additional data collection, producing scope adjusted plan 460. Observability reconfiguration module 250 reconfigures observability module(s) 412 according to scope adjusted plan 460, producing observability configuration 470.

While module 250 is implementing observability according to plan 460, application 200 receives additional application execution data 402 and infrastructure state data 406 of application 400, as well as granularity data 480. Module 250 further adjusts plan 460 according to the new data, producing a new version of observability configuration 470.

Figure 5:
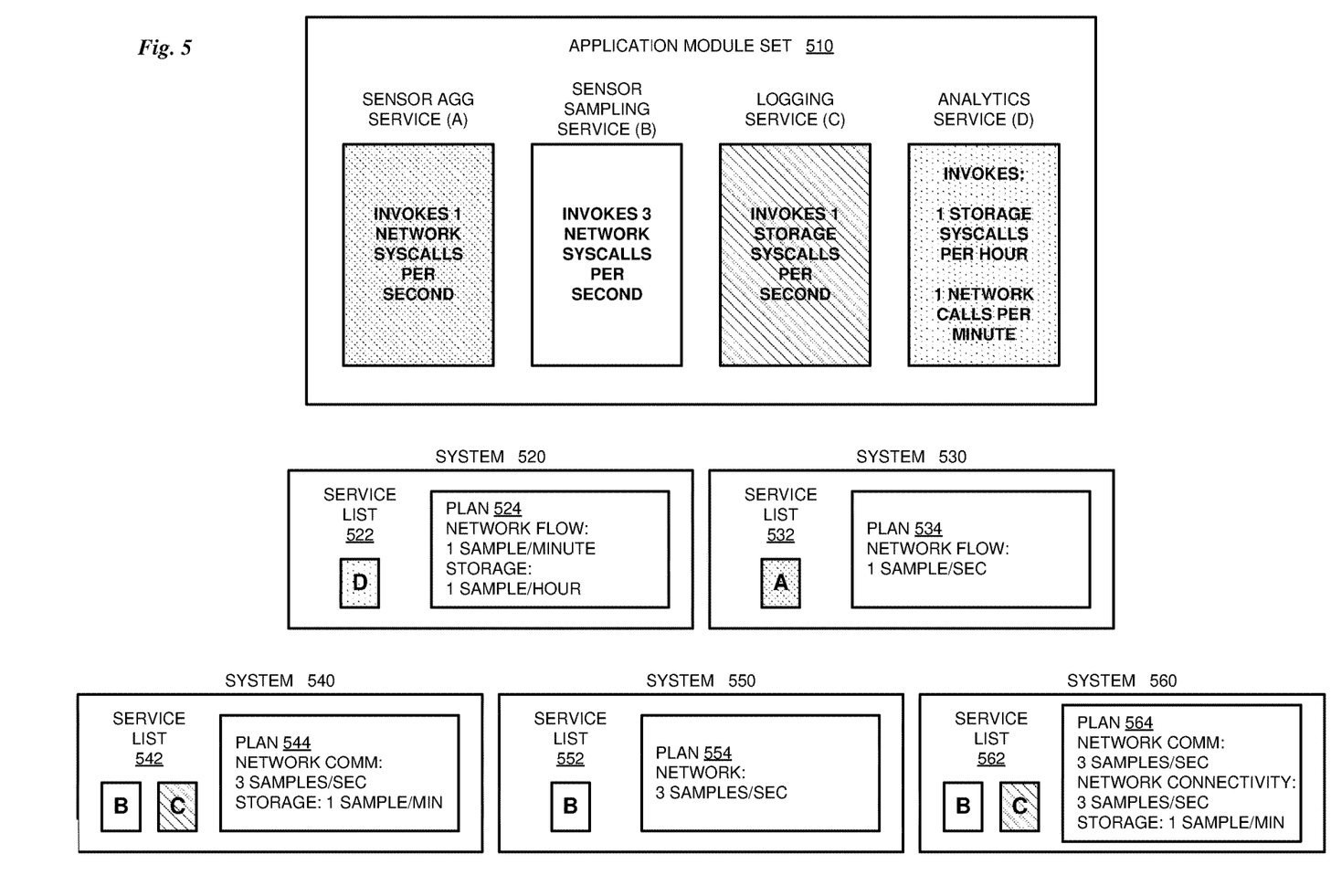
FIG. 5 depicts an example of adaptive observability module configuration in accordance with an illustrative embodiment.

With reference to FIG. 5, this figure depicts an example of adaptive observability module configuration in accordance with an illustrative embodiment. The example can be executed using application 200 in FIG. 2.

An application for which observability is being implemented includes application module set 510, including Services A, B, C, and D. Service list 522 indicates that Service D is executing on system 520. Service list 532 indicates that Service A is executing on system 530. Service list 542 indicates that Services B and C are executing on system 540. Service list 552 indicates that Service B is executing on system 550. Service list 562 indicates that Services B and C are executing on system 560. As a result, each of systems 520, 530, 540, 550, and 560 has a corresponding observability plan 524, 534, 544, 554, and 564. Plans are adapted to a particular service and system combination. For example, because Services A and B do not use storage, plan 534 for system 530 (running only Service A) and plan 554 for system 550 (running only Service B) do not include storage observability.

Figure 6:
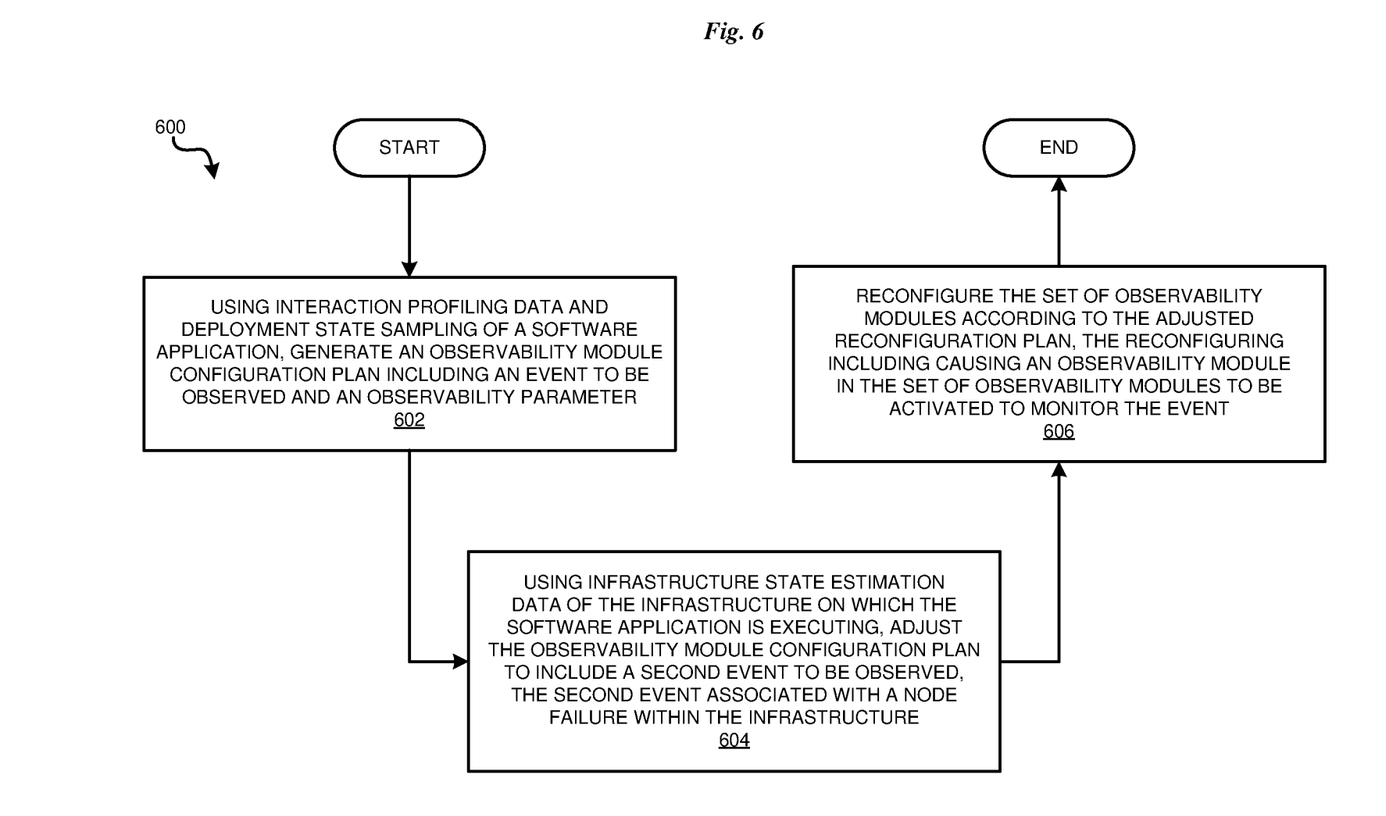
FIG. 6 depicts a flowchart of an example process for adaptive observability module configuration in accordance with an illustrative embodiment.

With reference to FIG. 6, this figure depicts a flowchart of an example process for adaptive observability module configuration in accordance with an illustrative embodiment. Process 600 can be implemented in application 200 in FIG. 2.

In block 602, the application, using interaction profiling data and deployment state sampling of a software application, generates an observability module configuration plan including an event to be observed and an observability parameter. In block 604, the application, using infrastructure state estimation data of the infrastructure on which the software application is executing, adjusts the observability module configuration plan to include a second event to be observed, the second event associated with a node failure within the infrastructure. In block 606, the application reconfigures the set of observability modules according to the adjusted reconfiguration plan, the reconfiguring including causing an observability module in the set of observability modules to be activated to monitor the event. Then the application ends.

Thus, a computer implemented method, system or apparatus, and computer program product are provided in the illustrative embodiments for adaptive observability module configuration and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:
generating, using interaction profiling data and deployment state data of a software application, an observability module configuration plan, the configuration plan comprising an event to be observed and an observability parameter;
adjusting, using infrastructure state estimation data of the infrastructure on which the software application is executing, the observability module configuration plan, the adjusting resulting in an adjusted reconfiguration plan, the adjusted reconfiguration plan comprising a second event to be observed, the second event associated with a node failure within the infrastructure; and
reconfiguring, according to the adjusted reconfiguration plan, a set of observability modules, the reconfiguring comprising causing an observability module in the set of observability modules to be activated to monitor the event.

2. The computer-implemented method of claim 1, further comprising:
extracting, from execution data of the software application, the interaction profiling data, the interaction profiling data comprising data of a plurality of operating system calls performed by the software application.

3. The computer-implemented method of claim 1, further comprising: extracting, from execution data of the software application and infrastructure state data, the deployment state data, the deployment state data comprising data of an executing instance of a component of the software application and data of a system on which the component is executing.

4. The computer-implemented method of claim 1, wherein the reconfiguring further comprises:
invoking, with a defined variable corresponding to an event to be observed, a user-mode observability module, the user-mode observability module executing in user memory of an operating system; and
causing the user-mode observability module to activate a predefined portion of a kernel-mode observability module, the predefined portion implementing observability of the event to be observed.

5. The computer-implemented method of claim 4, wherein compilation of the predefined portion is controlled by a state of the defined variable.

6. The computer-implemented method of claim 4, wherein causing execution of a wrapper function in the user-mode observability module results in activating the predefined portion.

7. The computer-implemented method of claim 4, wherein causing the user-mode observability module to activate the predefined portion of the kernel-mode observability module is performed upon expiration of a time period between activations of the kernel-mode observability module.

8. The computer-implemented method of claim 4, further comprising:
causing, upon expiration of a module activation time period, the user-mode observability module to deactivate the predefined portion of a kernel-mode observability module.

9. A computer program product comprising one or more computer readable storage medium, and program instructions collectively stored on the one or more computer readable storage medium, the program instructions executable by a processor to cause the processor to perform operations comprising:
generating, using interaction profiling data and deployment state data of a software application, an observability module configuration plan, the configuration plan comprising an event to be observed and an observability parameter;
adjusting, using infrastructure state estimation data of the infrastructure on which the software application is executing, the observability module configuration plan, the adjusting resulting in an adjusted reconfiguration plan, the adjusted reconfiguration plan comprising a second event to be observed, the second event associated with a node failure within the infrastructure; and
reconfiguring, according to the adjusted reconfiguration plan, a set of observability modules, the reconfiguring comprising causing an observability module in the set of observability modules to be activated to monitor the event.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

12. The computer program product of claim 9, further comprising:
extracting, from execution data of the software application, the interaction profiling data, the interaction profiling data comprising data of a plurality of operating system calls performed by the software application.

13. The computer program product of claim 9, further comprising: extracting, from execution data of the software application and infrastructure state data, the deployment state data, the deployment state data comprising data of an executing instance of a component of the software application and data of a system on which the component is executing.

14. The computer program product of claim 9, wherein the reconfiguring further comprises:
invoking, with a defined variable corresponding to an event to be observed, a user-mode observability module, the user-mode observability module executing in user memory of an operating system; and
causing the user-mode observability module to activate a predefined portion of a kernel-mode observability module, the predefined portion implementing observability of the event to be observed.

15. The computer program product of claim 14, wherein compilation of the predefined portion is controlled by a state of the defined variable.

16. The computer program product of claim 14, wherein causing execution of a wrapper function in the user-mode observability module results in activating the predefined portion.

17. The computer program product of claim 14, wherein causing the user-mode observability module to activate the predefined portion of the kernel-mode observability module is performed upon expiration of a time period between activations of the kernel-mode observability module.

18. The computer program product of claim 14, further comprising:
causing, upon expiration of a module activation time period, the user-mode observability module to deactivate the predefined portion of a kernel-mode observability module.

19. A computer system comprising a processor and one or more computer readable storage media, and program instructions collectively stored on the one or more computer readable storage media, the program instructions executable by the processor to cause the processor to perform operations comprising:
generating, using interaction profiling data and deployment state data of a software application, an observability module configuration plan, the configuration plan comprising an event to be observed and an observability parameter;
adjusting, using infrastructure state estimation data of the infrastructure on which the software application is executing, the observability module configuration plan, the adjusting resulting in an adjusted reconfiguration plan, the adjusted reconfiguration plan comprising a second event to be observed, the second event associated with a node failure within the infrastructure; and reconfiguring, according to the adjusted reconfiguration plan, a set of observability modules, the reconfiguring comprising causing an observability module in the set of observability modules to be activated to monitor the event.

20. The computer system of claim 19, further comprising:
extracting, from execution data of the software application, the interaction profiling data, the interaction profiling data comprising data of a plurality of operating system calls performed by the software application.

* * * * *